United States Patent [19]

Brooks et al.

[11] Patent Number: 5,371,747
[45] Date of Patent: Dec. 6, 1994

[54] DEBUGGER PROGRAM WHICH INCLUDES CORRELATION OF COMPUTER PROGRAM SOURCE CODE WITH OPTIMIZED OBJECT CODE

[75] Inventors: Gary S. Brooks, Garland; Steven M. Simmons, Dallas, both of Tex.

[73] Assignee: Convex Computer Corporation, Richardson, Tex.

[21] Appl. No.: 893,761

[22] Filed: Jun. 5, 1992

[51] Int. Cl.$^5$ .............................................. G06F 11/00
[52] U.S. Cl. .................................. 371/19; 364/267.91; 364/275.5; 364/DIG. 1; 395/575
[58] Field of Search .................. 371/19; 395/575, 700; 364/267.91, 275.5

[56] References Cited

U.S. PATENT DOCUMENTS 5,175,856 12/1992 Van Dyke et al. ................ 395/700

OTHER PUBLICATIONS

P. T. Zellweger, Xerox Corporation, Palo Alto Research Center, *Interactive Source-Level Debugging of Optimized Programs*, 1984.
P. T. Zellweger, "An Interactive High-Level Debugger for Control-Flow Optimized Programs (Summary)", Association for Computing Machinery, 1983, pp. 159-171.
B. Beander, Digital Equipment Corporation, "VAX DEBUG: An Interactive, Symbolic, Multilingual Debugger", Association for Computing Machinery, 1983, pp. 173-179.
D. Coutant, S. Meloy & M. Ruscetta, "DOC: A Practical Approach to Source-Level Debugging of Globally Optimized Code", Hewlett-Packard, Association for Computing Machinery, 1988, pp. 125-134.
J. Hennessy, Stanford University, "Symbolic Debugging of Optimized Code", *ACM Transactions on Programming Languages and Systems*, vol. 4, No. 3, Jul. 1982, pp. 323-344.
"Technical Correspondence—A Note on Hennessy's Symbolic Debugging of Optimized Code", *ACM Transactions on Programming Languages and Systems*, vol. 7, No. 1, Jan. 1985, pp. 176-181.
U. Hozle, C. Chambers & D. Ungar, "Debugging Optimized Code with Dynamic Deoptimization", Association for Computing Machinery, 1992, pp. 32-43.
W. H. Harrison, "Compiler Analysis of the Value Ranges for Variables", *IEEE Transactions on Software Engineering*, vol. SE-3, No. 3, May 1977, pp. 243-250.
A. V. Aho, R. Sethi & J. Ullman, *Compilers, Principles, Techniques & Tools*, Addison Wellsey, Copyright 1986, Reprinted 1987, pp. 643-648 and pp. 703-711.

*Primary Examiner*—Charles E. Atkinson
*Attorney, Agent, or Firm*—Winstead Sechrest & Minick

[57] ABSTRACT

Debugging of computer programs is necessary for the development of the programs as well as for maintaining the operation of the programs. Symbolic debugging requires the ability to relate the current position in the object code program to the corresponding position in the source code. In the absence of compiler optimization, correlating the source and object code elements is a straightforward procedure. However, when the object code has been optimized, the relation between the source code constructs and object code instructions can become convoluted and complex. A correlation technique for optimized code is disclosed which maps the source constructs (source units) through each of the optimization operations by use of compilation nodes and associated source units to build a table which relates ranges of object instructions to the source units which produced the object instructions.

9 Claims, 14 Drawing Sheets

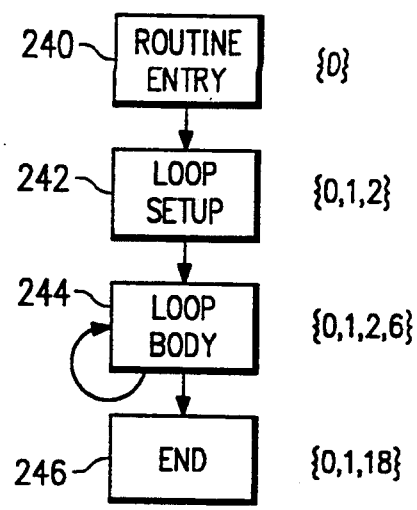
FIG. 8
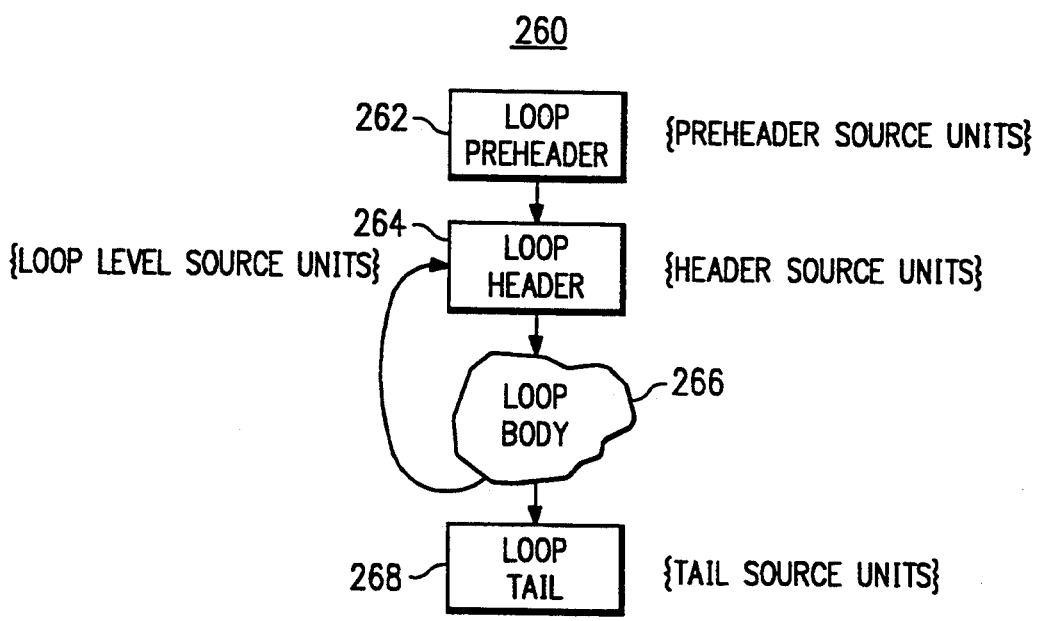
FIG. 9
FIG. 10

PRE-CODE MOTION

| SOURCE UNIT ANNOTATIONS | NODE IDENTIFIER | NODE TYPE AND INPUT & OUTPUT ARCS |
|---|---|---|
| 0000000000111111111 | | |
| 0123456789012345678 | | |
| R | N04f9a10: | CN_ENTRY SUCCS: N04f9808 |
| R | N04fa4a4: | CN_GOTO |
| [......] | | |
| RBL | N04fb224: | ?i2 = N04fe0a4 |
| RBL | N05a350c: | ?i4 = N04fcea4 |
| RBL | N05a320c: | ?i3 = N04fdc24 |
| RBL | N05a368c: | ?c5 = N04fdf24 |
| RBL  B | N04fa028: | CN_ENTRY in N04fa028 SUCCS: N04fa028 N04f9d1c N05a38cc |
| RBL  BS EE | N05a35cc: | ?i4 |
| RBL  BS EE | N04fba64: | CN_CONVERT N05a32cc |
| RBL  B    SE E | N05a32cc: | ?i3 |
| RBL  B    SE E | N04fbee4: | CN_CONVERT N05a32cc |
| RBL  BS E ESEE | N04fb9a4: | X |
| RBL  BS | N05a2fcc: | ?i2 |
| RBL  BS | N04fd264: | N05a2fcc |
| RBL  B | N05a314c: | N05a32cc |
| RBL  B | N05a344c: | N05a35cc |
| RBL  B | N05a374c: | ?c5 |
| RBL  B | N05a308c: | ?i3 = N05a314c |
| RBL  B | N05a338c: | ?i4 = N05a344c |
| RBL  BS E | N05a2f0c: | N04fba64+N04fb9a4 |
| RBL  B    SE | N04fbca4: | N04fb9a4*N04fbee4 |
| RBL  BS E | N04fbb24: | CN_CONVERT N05a2f0c |
| RBL  B | N04fafe4: | CN_LT N04fd264 N05a374c |
| RBL  B  S | N04fbbe4: | X = N04fbca4 |
| RBL  BS | N04fb524: | A[N04fd264] = N04fbb24 |
| RBL  B | N04fb764: | ?i2 = N04fd264 |
| RBL  B | N04fd564: | CN_IF N04fafe4 |
| RB     S | N04f9d1c: | CN_ENTRY SUCCS: N04f990c |
| RB     S | N04fc2a4: | CN_RETURN |
| [......] | | |

POST-CODE MOTION

```
            SOURCE UNIT        NODE     NODE TYPE AND INPUT & OUTPUT ARCS
            ANNOTATIONS        IDENTIFIER
       000000000011111111 1
       012345678901234 5678

R                       N04f9a10: CN_ENTRY SUCCS: N04f9808
       R                       N04fa4a4: CN_GOTO
       [...]
       RBL                     N04fb224: ?i2 = N04fe0a4
       RBL                     N05a350c: ?i4 = N04fcea4
       RBL                     N05a320c: ?i3 = N04fdc24
       RBL                     N05a368c: ?c5 = N04fdf24
       RBL                     N04fa028: CN_ENTRY SUCCS: N04f9c18
                                         N04f9c18
       RBL     S  E    ESEE    N04fb9a4: X
    ┌▶ RBL    B               N04f9c18: CN_ENTRY in N04f9c18 SUCCS:
    │                                    N04f9c18 N04f9e20 N05a38cc
    │  RBL    S  EE            N05a35cc: ?i4
    │  RBL    BS EE            N04fba64: CN_CONVERT N05a35cc
    │  RBL    B       SE  E    N05a32cc: ?i3
    │  RBL    B       SE  E    N04fbee4: CN_CONVERT N05a32cc
    │  RBL    BS               N05a2fcc: ?i2
    │  RBL    BS               N04fd264:   N05a2fcc
    │  RBL    B                N05a314c:   N05a32cc
    │  RBL    B                N05a344c:   N05a35cc
    │  RBL    B                N05a374c:   ?c5
    │  RBL    B                N05a308c: ?i3 = N05a314c
    │  RBL    B                N05a338c: ?i4 = N05a344c
    │  RBL    BS E             N05a2f0c:   N04fba64+N04fb9a4
    │  RBL    B       SE       N04fbca4:   N04fb9a4*N04fbee4
    │  RBL    BS E             N04fbb24: CN_CONVERT N05a2f0c
    │  RBL    B                N04fafe4: CN_LT N04fd264 N05a374c
    │  RBL    BS               N04fb524: A[N04fd264] = N04fbb24
    │  RBL    B                N04fb764: ?i2 = N04fd264
    └─ RBL    B                N04fd564: CN_IF N04fafe4
       RBL                     N04f9e20: CN_ENTRY SUCCS: N04f9dlc
       RBL          S          N04fbbe4: X = N04fbca4
       RB         S N04f9dlc: CN_ENTRY SUCCS: N04f990c
       RB         S N04fc2a4: CN_RETURN
       [...]
```

*FIG. 12*

```
DisassemblyWindow  InstructionView          Disassembly Window
         pc = (0x80001378)  process: [#0/0] Alive 0x80001354 MUNGE:       ld.w    @8(ap),s0       ; N
0x80001358 MUNGE+(0x4):  neg.w   s0,s0
0x8000135a MUNGE+(0x6):  le.w    #0,s0
0x8000135e MUNGE+(0xa):  brs.t   MUNGE+(0x48)
0x80001360 MUNGE+(0xc):  ld.w    0(ap),a2
0x80001364 MUNGE+(0x10): ld.w    @8(ap),a3       ; A
0x80001368 MUNGE+(0x14): add.w   #-4,a2          ; N
0x8000136c MUNGE+(0x18): shf     #2,a3
0x8000136e MUNGE+(0x1a): ld.w    #3,s3
0x80001372 MUNGE+(0x1e): ld.w    #1,s2
0x80001376 MUNGE+(0x22): add.w   a2,a3
0x80001378 MUNGE+(0x24): ld.w    @4(ap),s1       ; X
0x8000137c MUNGE+(0x28): cvtw.s  s3,s0
0x8000137e MUNGE+(0x2a): cvtw.s  s2,s4
0x80001380 MUNGE+(0x2c): add.w   #4,a2
0x80001382 MUNGE+(0x2e): add.w   #1,s2
0x80001386 MUNGE+(0x32): add.w   #3,s3
0x8000138a MUNGE+(0x36): add.s   s1,s0
0x8000138c MUNGE+(0x38): cvts.w  s0,s0
0x8000138e MUNGE+(0x3a): mul.s   s4,s1
0x80001390 MUNGE+(0x3c): lt.w    a2,a3
0x80001392 MUNGE+(0x3e): st.w    s0,0(a2)                352
```

FIG. 14a

```
Source Window
SourceWindow  FileView  SourceUnit  ProcessWindows
         process[#0/0]  file: munge.f 1
  2   subroutine munge(a,x,n)
  3
  4   integer a(n)
  5
  6   do i = 1, n
  7     a(i) = i * 3 + ※
  8     x = ※ * i
  9   enddo
 10   end
 11
```

| DisassemblyWindow | InstructionView | | Disassembly Window | |
|---|---|---|---|---|
| | | pc = (0x80001382) process: [#0/0] Alive | | |
| 0x80001368 | MUNGE+(0x14): | add.w | #-4,a2 | |
| 0x8000136c | MUNGE+(0x18): | shf | #2,a3 | |
| 0x8000136e | MUNGE+(0x1a): | ld.w | #3,s3 | |
| 0x80001372 | MUNGE+(0x1e): | ld.w | #1,s2 | |
| 0x80001376 | MUNGE+(0x22): | add.w | a2,a3 | |
| 0x80001378 | MUNGE+(0x24): | ld.w | @4(ap),s1 | ; x |
| 0x8000137c | MUNGE+(0x28): | cvtw.s | s3,s0 | |
| 0x8000137e | MUNGE+(0x2a): | cvtw.s | s2,s4 | |
| 0x80001380 | MUNGE+(0x2c): | add.w | #4,a2 | |
| 0x80001382 | MUNGE+(0x2e): | add.w | #1,s2 | |
| 0x80001386 | MUNGE+(0x32): | add.w | #3,s3 | |
| 0x8000138a | MUNGE+(0x36): | add.s | s1,s0 | |
| 0x8000138c | MUNGE+(0x38): | cvts.w | s0,s0 | |
| 0x8000138e | MUNGE+(0x3a): | mul.s | s4,s1 | |
| 0x80001390 | MUNGE+(0x3c): | lt.w | a2,a3 | |
| 0x80001392 | MUNGE+(0x3e): | st.w | s0,0(a2) | |
| 0x80001396 | MUNGE+(0x42): | bra.t | MUNGE+(0x28) | |
| 0x80001398 | MUNGE+(0x44): | st.w | s1,@4(ap) | |
| 0x8000139c | MUNGE+(0x48): | rtn | | |
| 0x8000139e | MUNGE+(0x4a): | exit | 0x1 | |
| 0x800013a2 | MUNGE+(0x4e): | exit | 0 | |
| 0x800013a6 | MUNGE+(0x52): | exit | 0 | ; x |

FIG. 15a

Source Window

SourceWindow  FileView  SourceUnit  ProcessWindows process[#0/0]  file: munge.f

```
1
2    subroutine munge(a,x,n)
3
4    integer a(n)
5
6 B  do i=1,n
7      a(i) = i*3+x
8      x = x*i
9    enddo
10   end
11
```

DEBUGGER PROGRAM WHICH INCLUDES CORRELATION OF COMPUTER PROGRAM SOURCE CODE WITH OPTIMIZED OBJECT CODE

FIELD OF THE INVENTION

The invention relates in general to the compilation of computer program source code to produce object code and in particular tea debugger program for use when such compilation involves optimization of the object code.

BACKGROUND OF THE INVENTION

In the development of computer software, it is necessary to perform a function termed "debugging" which involves testing and evaluating the software to find and correct errors and improper operation. An effective debugger program is necessary for rapid and efficient development of software.

The original coding for a computer program is termed the source code. This is the code that is written and understood by a programmer. The source code is processed by a program termed a compiler to produce an assembly code. The assembly code is then further processed by a program termed an assembler to produce an object file. Multiple object files are linked by a loader program to produce an executable program which is termed the object code, which comprises binary machine language instructions that can be executed directly by a computer.

In testing software, the object code must be executed by a computer in a testing phase so that proper operation of the code can be determined and any errors or spurious operations can be detected. When a problem is detected at a particular location in the object code, a correction of that error must generally be made in the original source code. However, in most cases, it is not readily apparent which portion of the object code relates directly back to a particular line or construct of the source code. It is therefore an important function of the debugger program to provide such a relationship. This is termed debugging of the source code at a symbolic, source code, level.

A debugger program crucially relies on its ability to map from a symbolic construct in the source code to a point(s) in the object code and to map back from a point in the object code to a construct(s) in the source code. With this capability, the debugger program allows a user to:

1. set breakpoints and tracepoints in source code terms.
2. allow the debugger to incrementally step (execute) constructs in the source or object code.
3. allow the debugger program to communicate the current point of execution in the object code to terms of the source code.
4. given a point in the program (object code), allows the debugger program to determine the correct lexical context in which to interpret user defined program symbols.

A major factor of complexity arises in the operation of a debugger program when the object code is optimized. Optimization is a process performed in certain compilers which enhances the speed of operation of the resulting compiled code. When a source code program is compiled with optimization, the relationships between the source code and the resulting object code is much more complex than in the case of compilation without optimization.

In compiler-debugger systems, without optimization, the source code to object code correlation is accomplished by partitioning the source code and then relating each partition to a single instruction in the object code. For example, in most Unix debugger programs, the source code is partitioned into lines and each line is related to a single instruction in the object code. When there is no optimization of the object code, it is sufficient to relate a source code construct to a single contiguous set of instructions to provide basic debugging functionality. Further, the instructions which comprise a source code construct will appear in a contiguous section of the object code. All instructions which correspond to a particular source code construct can be readily determined.

However, in the presence of optimization for the object code, all instructions which correspond to a source code construct will not necessarily be contiguous in the object code. The use of optimization can drastically reorder, eliminate, replicate, factor, fuse and transform source code elements. Instructions corresponding to a particular source code construct may appear in widely disparate sections of the object code. Because of such fragmentation in the object code for a source code construct, correlating a source code construct to a single instruction is not sufficient to enable standard debugging functionality.

The process of optimization for "C" code is described in "CONVEX "C" OPTIMIZATION GUIDE" 2nd Edition, Convex Press, Richardson, Tex., April, 1991. Operation of FORTRAN code is described in "CONVEX FORTRAN OPTIMIZATION GUIDE", 3rd Edition, Convex Press, Richardson, Tex., November, 1991.

In view of the desirability to optimize object code, there exists a need to relate each source code construct to one or more ranges of instructions in the object code. There is further a need to provide a system and method for communicating this correlation of source code to object code to the debugger program. Still further, there is a need to provide a system and method for utilizing this information to accomplish the functions required in a debugger program.

SUMMARY OF THE INVENTION

A selected embodiment of the present invention comprises a debugger program for use with object code which is produced by the optimized compiling of source code. A compiler program provides correlation between machine instructions in the object code and elements (source units) of the source code. The source units reflect the syntax of the source code. The compiler produces a source unit table which comprises a plurality of source units each entry of which includes a unique index, a position identification in the source code, a context identification of the source unit in the source code, a linkage to other source units where such linkage exists and a type identification for the source unit. The compiler program further produces a source range table which specifies one or more ranges of the machine instructions which are associated with each of the source units. Each element of the source code can be related to corresponding machine instructions through the source units and the source range table. The debugger program uses both the source unit table and source range table.

A further aspect of the present invention is a method for determining correlation between optimized object code and corresponding source code. This method includes the steps of processing the source code to produce a plurality of source units. Each of the source units includes a unique index, a position identification in the source code, a context identification of the source unit in the source code, a linkage to other source units where such linkage exists and a type identification for the source unit. In a further step, the source code is processed to produce compiler nodes which include both entry nodes and computation nodes. The processing of the source code produces a sequence of machine instructions. An annotation is generated for each of the compiler nodes to identify the source units related to each of the compiler nodes. Finally, a source range table is generated which specifies one or more ranges of the machine instructions which are associated with each of the source units. Each element of the source code can be related to corresponding ones of the machine instructions by use of the source units and the source range table.

A further aspect of the present invention comprises a method of operation of a debugger program in which source units are highlighted on a display to indicate that corresponding elements of the object file, machine language instructions, have been executed or are to be executed by the computer. This allows the programmer to visualize the execution of the program by the sequential highlighting of the units of the source code as the program steps through the machine language instructions.

BRIEF DESCRIPTION OF THE DRAWINGS

For a more complete understanding of the present invention and the advantages thereof, reference is now made to the following description taken in conjunction with the accompanying drawings in which:

FIG. 8 is an illustration of basic blocks and corresponding annotations for the FORTRAN routine "munge" shown in FIG. 3, FIG. 9 is an illustration of a prototypical loop, FIG. 10 is an illustration of a FORTRAN DO loop which includes an invariant variable, FIG. 11 is a table entitled "PRE-CODE MOTION" which illustrates source unit annotations before code motion for the FORTRAN routine "munge" shown in FIG. 3, FIG. 12 is a table entitled "PRE-CODE MOTION" which illustrates source unit annotations after code motion for the FORTRAN routine "munge" shown in FIG. 3, FIG. 14a is an illustration of a display in which a particular line of the object code being executed is highlighted, FIG. 14b is a display highlighting the source units and the source code of the subroutine which corresponds to the machine instruction under execution as shown in FIG. 14a, FIG. 15a is an illustration of machine instructions with one instruction noted as being in execution, FIG. 15b is a screen display illustrating a highlight of the source unit within the source code that corresponds to the particular machine language instruction in execution as shown in FIG. 15a, FIG. 16 is a flow diagram illustrating the operational steps for generating the source unit table and source range table of the present invention.

DETAILED DESCRIPTION OF THE INVENTION

Figure 1:
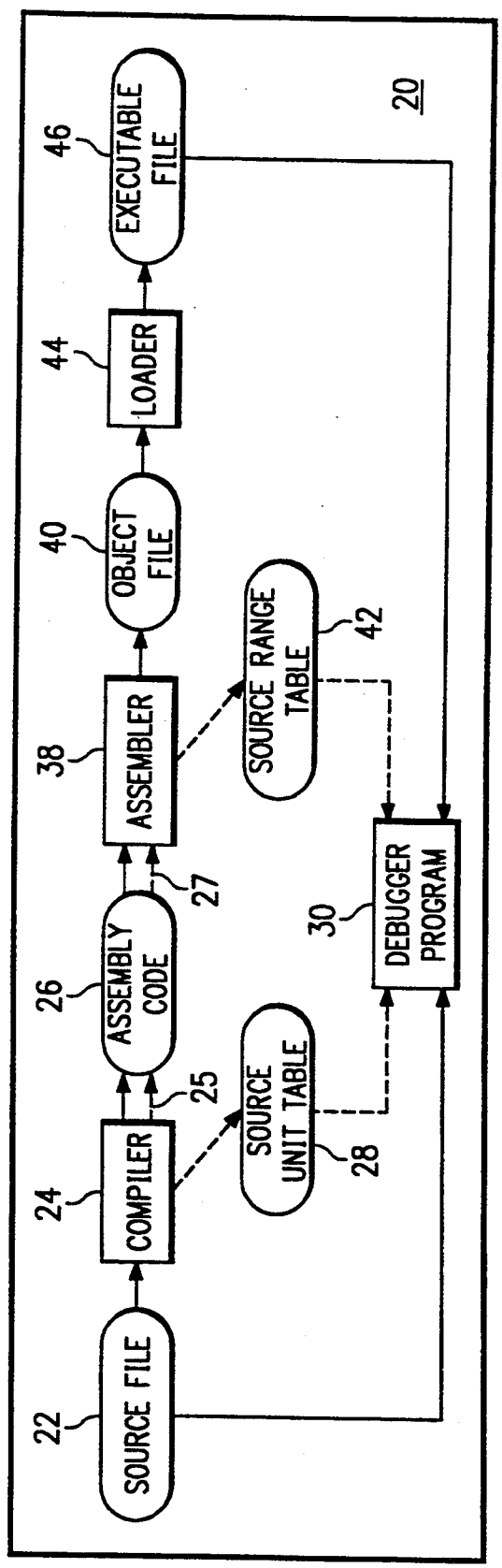
FIG. 1 is a block diagram illustrating the general environment for compiling and assembling source code into object code and including aspects representing the present invention and its relationship to the general environment.

The overall flow of information and relationships of various programs used in compiling-debugging code is illustrated in a flow diagram 20 shown in FIG. 1. Briefly, the solid arrows represent the conventional flow of information in a traditional compiler-debugger environment. The dashed arrows represent the information and data flow added to the conventional process in accordance with the present invention.

A source file 22 is produced by a programmer in any one of many available languages such as "C" FORTRAN or others The source file 22 is provided to a compiler 24 which produces assembly code 26. In one aspect of the present invention, the compiler 24 further produces a source unit table 28, which is further defined below and an example is shown in Table 1. For each source file, such as 22, there is provided a separate source unit table 28. The source unit table 28 is provided to a debugger program 30. Likewise, the source file 22 is provided to the debugger program 30.

The assembly code 26 is provided to an assembler 38 which in turn produces an object file 40. A further aspect of the present invention is that the compiler 24 provides a set of source range directives, further defined below, as indicated by the dashed arrows 25 and 27, to the assembler 38. The assembler 38 produces a source range table 42, further defined below and shown as an example in Table 2, which is provided to the debugger program 30. The source range table correlates source units (i.e. source code in file 22) to instructions in the object file 40. The source range directives are entries which go into the source range table 42.

A loader 44 receives one or more of the object files 40 and links them together to produce an executable file 46. The object file 40 and executable file 46 comprise machine language instructions for direct execution by a computer. The executable file 46 is also provided to the debugger program 30.

The debugger program 30 receives the source file 22 and the executable file 46 as well as the source unit table 28 derived from the source file 22. For each object file 40, there is also provided a separate source range table 42 to the debugger program 30.

The present invention provides a mechanism and process for correlating source code to object code where the object code has been subject to one or more optimization routines. The source code to object code correlation is a set-based mechanism which is used to correlate sets of source units to compiler nodes. A source unit is defined herein to be a language independent syntactic piece of a program. All of the source units from a particular file are grouped together into the source unit table (see Table 1). The source unit table is produced during the compilation process and it is provided as a data file to the debugger program 30.

An example of the source unit table 28 is shown in Table 1 below. This is a table for the routine "munge" shown in FIG. 3.

TABLE 1

| SOURCE UNIT TABLE | | | | |
|---|---|---|---|---|
| SOURCE UNIT INDEX | | START POSITION | END POSITION | SRT INDEX |
| 0 | Routine | — 2 × 7 | 10 × 9 | (1) |
| 1 | Block | — 6 × 7 | 10 × 9 | (0) |
| 2 | Loop | — 6 × 7 | 9 × 11 | (2) |
| 3 | Statement | — 6 × 10 | 6 × 14 | ( ) |
| 4 | Expression | — 6 × 14 | 6 × 14 | ( ) |
| 5 | Expression | — 6 × 17 | 6 × 17 | ( ) |
| 6 | Block | — 7 × 10 | 8 × 18 | (11) |
| 7 | Statement | — 7 × 10 | 7 × 25 | (23 19 18) |
| 8 | Expression | — 7 × 12 | 7 × 12 | ( ) |
| 9 | Expression | — 7 × 17 | 7 × 25 | (20 12 6) |
| 10 | Expression | — 7 × 17 | 7 × 21 | (13) |
| 11 | Expression | — 7 × 17 | 7 × 17 | ( ) |
| 12 | Expression | — 7 × 21 | 7 × 21 | ( ) |
| 13 | Expression | — 7 × 25 | 7 × 25 | (8) |
| 14 | Expression | — 8 × 10 | 8 × 18 | (24 21 16 5) |
| 15 | Expression | — 8 × 14 | 8 × 18 | (22 17 9) |
| 16 | Expression | — 8 × 14 | 8 × 14 | (7) |
| 17 | Expression | — 8 × 18 | 8 × 18 | (15) |
| 18 | Statement | — 10 × 7 | 10 × 9 | (25) |

"Compiler node" is a term used in the following description. This term represents a computation which exists within a program and is well known and understood in the art of compiler technology. A further aspect of the present invention is that the source units are associated with the compiler nodes to provide a vehicle for tracking the source to object code correlation through the compiler optimization and code generation process. Each compiler node is associated with a set of source units that correspond to the node. In the process of the present invention, each node is annotated with a source unit if the node represents a computation which is used to realize a component of the source code represented by the source unit. Examples are described below in reference to FIGS. 5 and 7. The correspondence between source units and compiler nodes is tracked through each transformation and optimization in the compilation process. The tracking through each transformation is dependent upon the type of transformation that is performed.

Figure 2:
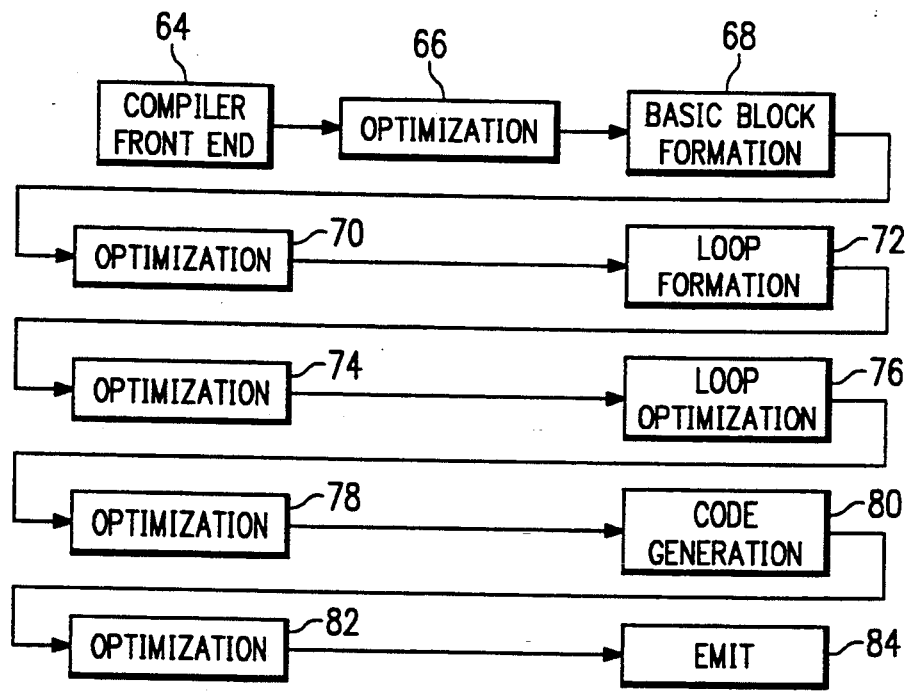
FIG. 2 is a block diagram overview of an optimized compilation process with multiple steps of optimization.

A schematic representation of the compilation process as it pertains to generation of the source range table is shown in FIG. 2. A compiler front end 64 constructs an initial node representation of the source program and initially annotates each node therein with a set of appropriate source units. This process is described in further detail below. Local and global optimizations are performed at each stage of the compilation process. At each optimization stage, the node to source unit correlation must be properly made.

Following the operation of the compiler front end 64, there is an optimization process 66 which is in turn followed by basic block formation 68. The operation of the basic block formation 68 is to make control flow explicit in the node representation. Following the basic block formation 68 there is another step of optimization 70. This is followed by loop formation 72. The operation of loop formation adds information about compiler detected loops to the node representation. Next, there is a further optimization step 74. Following step 74, there are sequential operations of loop optimization 76, optimization 78, code generation 80, optimization 82 and completion at the emit block 84. The multiple steps of optimization described in FIG. 2 are well known in the industry. Such compiler optimization is described in, for example, Alfred Aho, et al, "Compilers: Principles, Techniques, and Tools" Addison Wesley Publishing Company, copyright 1986.

A fundamental aspect of the present invention is termed a "source unit". This is a portion of source code that reflects the syntax of the program. Source units are language independent, abstracted portions of a program. For the process described herein, there are five classes of source units. These classes, with an abbreviation for each, are:

1. routines (r)
2. blocks (b)
3. loops (l)
4. statements (s)
5. expressions (e).

There are five attributes for each source unit. These attributes are:

1. An index used to uniquely identify the source unit.
2. The starting and ending character position of the source unit in the source file. This is a position identification. These source positions are used to manipulate the text files and to highlight the source unit.
3. The lexical context or scope in which the source unit occurs. This is termed context identification. The lexical scope is used to interpret identifiers at a particular point in the source file.
4. The index of the parent source unit, if any. This defines linkage to any other source units.

5. The class of the source unit described above.

The index for a source unit is a sequential number that identifies the source unit. The index numbers are not necessarily in the sequential order of appearance of the source units in the source code. An example of such an index can be a number, such as 35.

The starting and ending character positions of the source unit are identified in terms of row and column numbers. The source code is essentially organized as a single matrix with each line corresponding to a row and the position within a row defined as a column. There may be hundreds or even thousands of rows (lines) in the source code. A typical column width is 80 characters, although an implementation may be 4,096 wide. A source unit may have a starting position of, for example, row 37, column 2 and an ending position of row 38, column 12. As noted above, this position identification information can be used to manipulate the text files of the source code and to highlight on a display screen the source unit under consideration.

Figure 3:
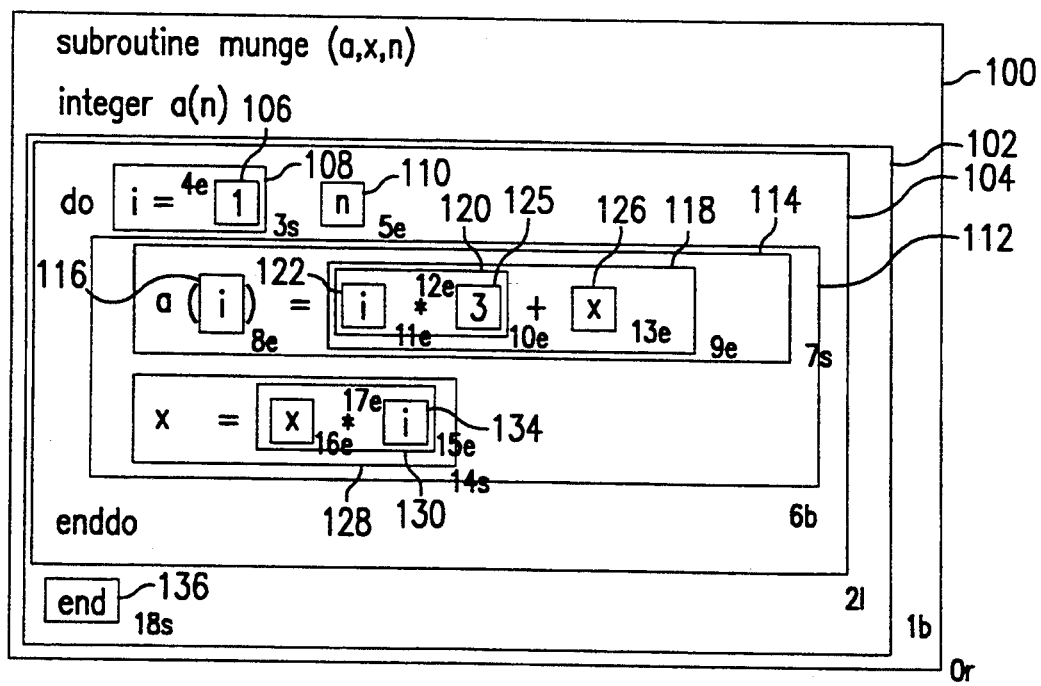
FIG. 3 is an illustration of source units in a sample FORTRAN routine entitled "munge"

The attribute which is termed the lexical context or scope in which the source unit occurs is defined by visible identifiers, i.e., variables that are in use and available with respect to the corresponding source unit. In FORTRAN, all of the visible identifiers in a particular subroutine are associated with each of the source units within that subroutine. Referring to FIG. 3 which is a FORTRAN routine entitled "munge", the identifiers are a, x and i. This set of identifiers represents the lexical scope and context attribute for the source units in the FORTRAN routine. But in another language, such as "C", the lexical scope may be only a subset of the variables within the entire routine. The definition of a lexical scope within each language is well known in the programming industry and is used in conjunction with the present invention as defined for the language of the source code being used. Lexical scope is defined in detail in the Aho, et al book noted above, specifically in section 7.4, pages 411–423.

Parent source unit attribute is the index number for the parent source unit of the source under consideration. For the example shown in FIG. 3, the parent for each source unit is the immediate greater source unit. There is only one parent source unit for each source unit. However, multiple source units may have the same parent. This is based on a logical tree structure building up from the more basic source units to the more specific ones of the source units. As an example, referring to FIG. 3, the source unit 7s has source unit 6b as the parent. Source unit 14s has source unit 6b as the parent. The parent of source unit 9e is the source unit 7s.

The kind of source unit attribute is the class identifier noted above. The class identifiers are routines (r), blocks (b), loops (l), statements (s) and expressions (e).

The above five attributes are defined for each source unit.

An example of all of the attributes for a defined source unit can be as follows. The source unit index number is 35, the starting and ending positions are row 37, column 25 and row 38, column 12 respectively, the lexical content is defined by the terms a, i and n, the parent source unit has index 24 and the kind (class) of source unit is statement (s).

Referring to FIG. 3, there is shown a simple FORTRAN routine in which the source units have been labeled. Each source unit is delimited within a box. Associated with each source unit is a index number and this number is positioned at the lower right-hand corner of each box. The index has two portions. The first is a sequential numerical index series and the second is a letter identification for the class of source unit, as defined above. Routine is represented by "r", loop is represented by "l", etc. For example, the "end" source unit 136 has index "18s".

In FIG. 3, there is illustrated a FORTRAN subroutine identified as "munge (a, x, n)". The source units identified by source unit indexes and the corresponding reference numeral are as follows:

| Source Unit Index | Reference Numeral |
| --- | --- |
| 0r | 100 |
| 1b | 102 |
| 2l | 104 |
| 3s | 106 |
| 4e | 108 |
| 5e | 110 |
| 6b | 112 |
| 7s | 114 |
| 8e | 116 |
| 9e | 118 |
| 10e | 120 |
| 11e | 122 |
| 12e | 125 |
| 13e | 126 |
| 14s | 128 |
| 15e | 130 |
| 16e | 132 |
| 17e | 134 |
| 18s | 136 |

The Source Unit Table shown in Table 1 illustrates the source units for the routine "munge" shown in FIG. 3. This table includes the source unit index, a start and end position for the source unit within the source code itself. The source code listing is essentially a matrix of rows and columns and the starting and ending positions are the corresponding positions in the numbered rows and numbered columns. The Source Range Table (SRT) index is a reference to the entries in the Source Range Table shown in Table 2.

After the source units of the source code have been determined, the compilation process begins by defining compiler nodes for the source code. There are two types of compiler nodes. These are (1) entry nodes and (2) computation nodes. Entry nodes are used to model basic blocks, which are described below in further detail. The entry nodes form a graph which represent the control flow in the program. An entry node is associated with a directed acyclic group of computation nodes. Computation nodes are used to represent computations embodied within a program.

Figure 4:
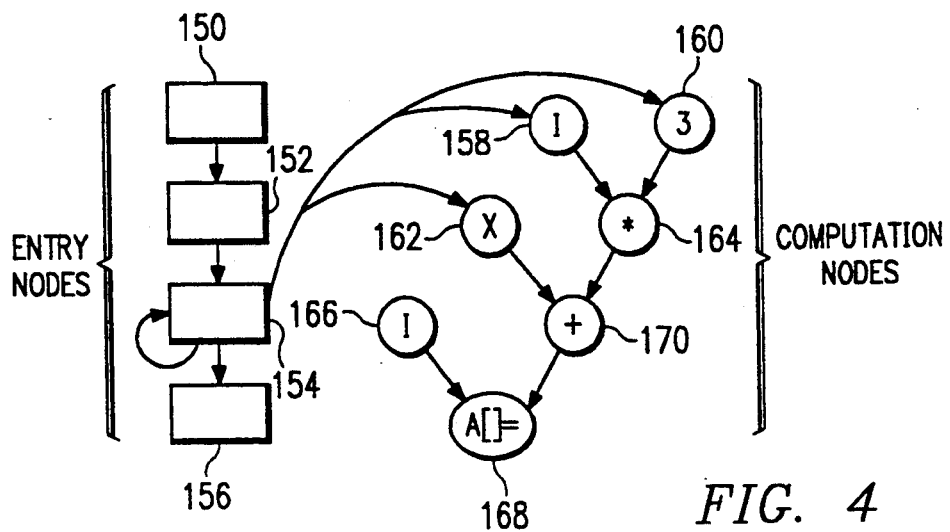
FIG. 4 is a schematic illustration of compiler nodes which include both entry nodes and computation nodes.

Referring now to FIG. 4 there are illustrated entry nodes 150, 152, 154 and 156 and computation nodes 158, 160, 162, 164, 166, 168 and 170.

FIG. 4 shows some of the entry nodes for the sample FORTRAN routine "munge" illustrated in FIG. 3. At entry node 154, the computation nodes 158–170 represent the calculation of:

$$a(i) = i * 3 + x$$

Figure 5:
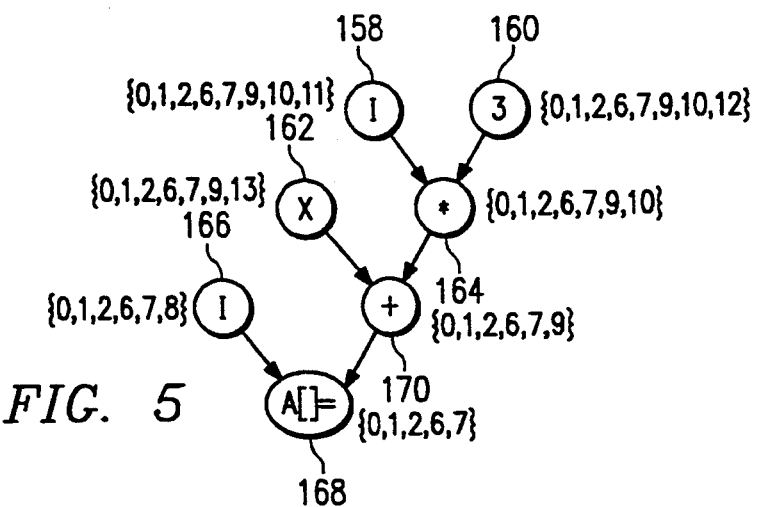
FIG. 5 is an illustration of a node tree with compilation node annotations.

Referring to FIG. 5, there are illustrated the annotations for the computation nodes shown in FIG. 4. These annotations are for the expression $a(i) = i * 3 + x$, which is a portion of the subroutine "munge" shown in FIG. 3. For example, node 160 is annotated with source units 1, 2, 3, 7, 8, 10, 11, and 13. The annotations for the other nodes are shown in the Figure. The annotations indicate that node 160 is specifically associated with the source units which annotate node 160. The annotations track the nodes through the compilation process.

A principal object of the present invention is to provide correlation between the source code and the object code to enhance the process of debugging. This is based on a process of annotating compilation nodes with sets of source units. A node is annotated with a source unit to indicate that the computation represented by the node is related to the source code represented by the source unit. The source unit annotation process consists of a group of major phases which follows the overall compilation process. These phases include:
1. source unit formation
2. basic block formation
3. loop formation, and
4. source range formation.

SOURCE UNIT FORMATION

The compilation process begins by parsing the source code into an abstract syntax tree. The abstract syntax represents the syntax and structure of the program. Semantic analysis takes the parse tree as input and produces a list of trees of nodes that reflect the logical structure of the program. It is during semantic analysis that the initial correspondence between source units and nodes is formed.

Source units, as defined herein, correspond directly to syntactic constructs in a language, but with one significant exception. Source units are made in the following manner. For each routine, function or subroutine, a routine source unit is made. For each expression, an expression source unit is made. For each statement, a statement source unit is made. For each looping construct, a loop source unit is made. Since looping constructs are typically statements in a language, an additional statement source unit is not made. Instead, loop source units are treated as statements by the debugger program, when it is appropriate.

The source units are language independent, that is, they are based on common language features. Therefore source units can be defined for most languages.

In "C" programs, a block source unit is made for each compound statement. In FORTRAN, a block source unit is made for the body of a routine or the group of statements in the then-clause or else-clause of a block-if statement. In both FORTRAN and C a block source unit is made for the body of each loop. The block source unit for a loop body is the noted exception. It is a special source unit that is synthesized by the compiler and plays a critical part in loop level optimizations.

Semantic analysis is based on a recursive walk of the parse tree, forming corresponding computation nodes. See FIG. 4. At each level of the recursive walk, source units are formed as directed by the syntax of the program.

Figure 6:
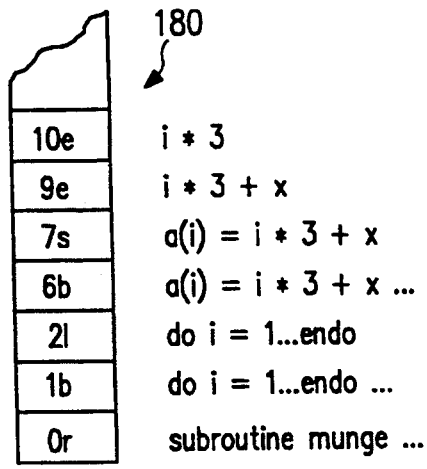
FIG. 6 is an illustration of a source unit stack for the FORTRAN routine "munge" shown in FIG. 3.

Each source unit is pushed onto a source unit stack. Referring now to FIG. 6, there is shown a source unit stack 180 for the FORTRAN routine "munge" illustrated in FIG. 3. The source unit indexes 0r, 1b, 21, 6b, 7s, 9e and 10e correspond to the respective code elements to the immediate right of the source unit indexes. See FIG. 3. The order of the source units on the stack reflects the nesting of source units in the source code. For example, consider the expression i * 3 in the procedure "munge" see FIG. 3 The routine source unit, 0r, is placed on the stack first. Next, before analysis of the body of the routine, the block source unit, 1b, is placed on the stacks. The source unit stack at the point 9f analyzing i * 3 is shown in FIG. 6. Source units that are syntactically nested in the program will appear on top of the source unit stack. Each source unit is logically stacked over its immediate parent source unit.

The initial node representation of the program is created during semantic analysis in the compiler front end 64. Nodes are either created directly or patterned off of existing nodes. New nodes must be annotated with a set of source units that indicate the source code which corresponds to the node. This can happen in one of several ways:

(1) The new node represents a computation that directly corresponds to the current syntactic construct under analysis. In this case the node is annotated with the set of all of the source units that are currently on the source unit stack. (See FIG. 6). For example, a * node will be created to model the multiplication in the expression i*3. This node will be annotated with all the source units that are currently on the source unit stack. For the i*3 expression shown on the top of the stack in FIG. 6, the node for this source unit is annotated with the set of source units {0, 1, 2, 6, 7, 9, 10}. The effect of this is to associate this node with the source units for the routine, body of the routine, the loop, etc. all the way to the multiplication term i * 3.

(2) The new node is an auxiliary that is needed to help model some computation. In this case, a source unit annotated primary node will already exist. The source units from the primary node are used to annotate the new auxiliary node.

(3) The new node results from some optimization. In this case, the node will be annotated with a set of source units that is a function of the source units on the nodes that participated in the optimization.

(4) The new node results from copying an existing node into a new context. In this case, the new node is annotated with the union of source units on the node and the set of source units on the source unit stack. A classic example of this are nodes in the exit test of a "while" loop in FORTRAN. The syntactic components of the exit test for a loop usually occur outside the body of the syntactic construct for the loop. However, the exit test must be copied into the body of the loop. In order to make sure the new exit test is associated with the body of the loop, the new exit test nodes are additionally annotated with the source units on the source unit stack which will contain the source unit for the body of the loop.

Figure 7:
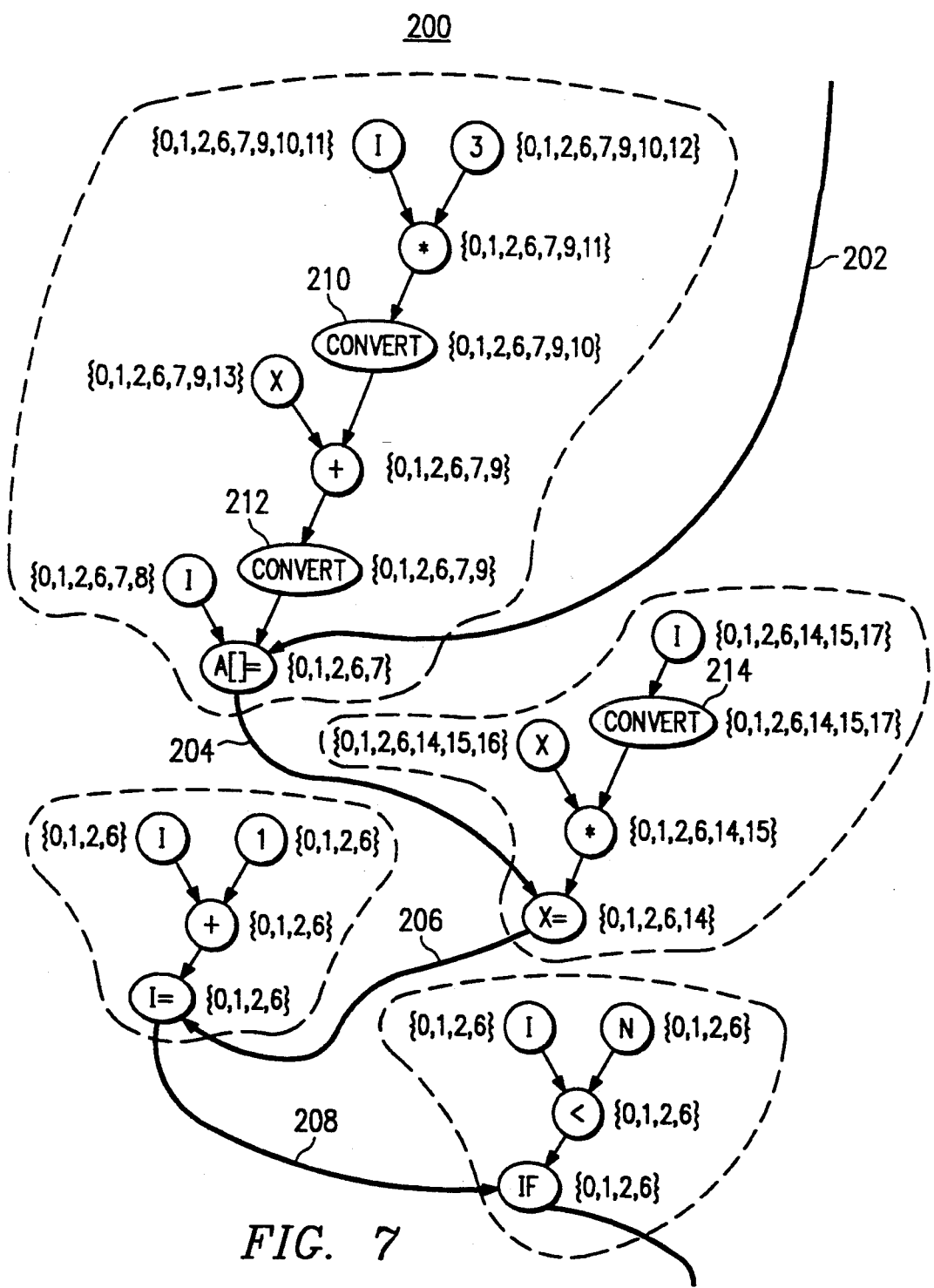
FIG. 7 is a schematic illustration of the initial source unit annotations for all of the nodes within the FORTRAN routine "munge" shown in FIG. 3.

Referring now to FIG. 7, there is shown in a composite tree 200 the annotations for all of the nodes in the body of the loop for the subroutine "munge" listed in FIG. 3. This includes nodes for the two statements of the body as well as additional nodes used to increment the loop control variable, I, and nodes to test for the end of the loop. The list of trees produced by the compiler front end 64 are linked together. This is indicated by the bold lines 202, 204, 206 and 208. Convert nodes 210, 212 and 214 have been inserted into the trees to explicitly represent conversions from integrals to reals and from reals to integers. These convert nodes are annotated with the same set of source units that are used to annotate the node being converted. The convert nodes are examples of auxiliary nodes that are patterned off of an already existing primary node. Note that all nodes in the body of the loop are annotated with at least the subset of source units {0, 1, 2, 6}. Source unit 6 is the block source unit for the body of the loop. Only nodes in the body of the loop are annotated with this source unit. Nodes outside the body of the loop will not be annotated with this source unit. This is an important aspect of the source unit annotation process and it plays an important role in loop analysis and loop level optimizations.

BASIC BLOCK FORMATION

Once the list of node trees is created, see FIG. 7, the compiler 24 translates these trees into a graph of basic blocks that reflect the control flow of the program. The set of basic blocks forms a graph in which cycles in the graph represent loops in the program.

A basic block is represented by a special type of node termed an "entry" node. A basic block has a single control flow entry point and a single control flow exit point and is used to group nodes together that reside in the same control flow path.

Groups of nodes are then placed at the end of each basic block. Basic blocks are annotated with the set of source units that are common to all nodes in the basic block. This is accomplished by incrementally taking the intersection of source units of each node as it is added to the basic blocks. This results in associating the intersection of all nodes in the basic block with the entry node for the basic block. These source units are used later in tracking transformations involving nodes from different basic blocks and transformations between basic blocks.

With respect to the routine "munge", see FIG. 3, four (primary) basic blocks have been constructed. See FIG. 8. These are routine entry block 240, loop setup block 242, loop body block 244 and end block 246. The routine entry block 240 is for the routine entry or prologue code. Any nodes in a routine's prologue are always annotated with just the source unit for the routine. As a result, the entry node for the prologue will be annotated with only the routine source unit. Next, the loop setup block 242 contains the loop's setup code. The loop source unit and any higher source units will be common to all nodes in the basic block, so the loop setup block node is annotated with the routine, routine body, and loop source units. Common to all nodes in the body of the loop is the loop body source unit. The final basic block in the routine consists solely of the END statement block 246 for the routine. The entry node for the end block 246 is annotated with the source unit for the END statement (see FIG. 3).

LOOP FORMATION

At higher optimization levels, such as -01, -02 and -03 as performed by compilers of Convex Computer Corp., the compiler 24 defines loops by detecting cycles in the graph of basic blocks. Loops are represented by the compiler by placing additional information for an entry node, which represents the entry point to the iterative code in the node of the loop body. An additional item of information associated with a loop is a set of source units for the body of the loop. This set of source units is the source code that is common to all basic blocks in the loop. This set is computed by taking the intersection of the source unit sets for all of the entry nodes comprising the loop. This is used to track loop-level optimizations.

Loop-level source unit annotations are used to initialize the basic block level source units of synthesized entry nodes, and to initialize the loop-level source of synthesized loops.

A prototypical loop is shown in FIG. 9. A loop 260 consists of a loop preheader 262, loop header 264, loop body 266, and a loop tail 268. The loop preheader 262 is a basic block that contains setup code for the loop. The loop header 264 is a basic block that is the single entry point into the loop. The loop body 266 includes the loop header 264 and any other basic blocks in the loop. The loop tail 268 is the block outside the loop to which control passes when the loop 260 is exited. The loop header 264 is special in that it is the entry node that is annotated with the loop source units. This is in addition to the basic block source unit for the loop header 264. In loop nests, the preheader of one loop may be the header of another (outer) loop. Not all loops have loop tails. The body of the loop may consist only of one basic block, the loop header. All loops have a loop preheader.

SOURCE RANGE FORMATION

Once the code has been optimized, code generation is performed. Code generation takes the graph of basic blocks and constructs a linear sequence of nodes which correspond directly to machine instructions. Each node represents instructions which are annotated with the set of source units to which the instruction corresponds. Once a node has been defined, the process of cogeneration produces the appropriate machine language instructions, which are in a binary format. The particular instructions that are generated are dependent upon the type of node as well as the type of computer which will run the machine instructions. Code generation of machine language instructions from nodes as defined herein, is well known in the art of compiler technology.

However, this is not a compact form that can be easily used by the debugger program 30. The preferred way to communicate source to object code correlations to the debugger is through source ranges.

TABLE 2

| Source Unit Annotations 0000000000111111111 0123456789012345678 | | Label | Opcode | Register Operands | | | Inst Data | Node | Name | line # | Misc |
|---|---|---|---|---|---|---|---|---|---|---|---|
| R | | 1 | 4f59b8 | | | | | | NULL_ENTRY | 3 | |
| R | e | | 4f57b0 | | | | | | SBUR_ENTRY | 3 | MUNGE (0) |
| R | | | 4f848c | SUB_W_FA | u0 | u0 sp # | | 0 | INSTR | 3 | |
| RBL | f | | 595764 | | | | | | ENTRY | 6 | |
| RBL E | | 4 | 4f734c | LD_W_YS | u0 | ap s0 # | | 0 | USE | 6 | N (8) |
| RBL | | 3 | 4f968c | NEG_W_SS | u0 | s0 s0 # | | 0 | NEG | 6 | |
| RBL | | 17 | 4f944c | LE_W_NS | u0 | u0 s0 # | | 0 | GT | 6 | |
| RBL | | | 4f95cc | JBRS_T_KX | u0 | u0 u0 | | 10 | IF | 6 | |
| RBL | | 18 | 4f5ecc | | | | | | ENTRY | 6 | |
| RBL | | | 4f890c | LD_W_XA | u0 | ap a2 # | | 0 | ADDRESS | 7 | A (0) |
| RBL E | | 12 | 4faacc | LD_W_YA | u0 | ap a3 # | | 0 | USE | 6 | N (8) |

TABLE 2-continued

SOURCE RANGES

| Source Unit Annotations 0000000000111111111 0123456789012345678 | | | Label | Opcode | Register Operands | | | Inst Data | Node Name | line # | Misc |
|---|---|---|---|---|---|---|---|---|---|---|---|
| RBL | | 11 | 4fa04c | ADD_W_NA | u0 | u0 | a2 # | ffffffc | ADD | 7 | ?i2 (0) |
| RBL | | 19 | 4f68cc | SHF_NA | u0 | u0 | a3 # | 2 | SHIFT | 6 | ?c5 (0) |
| RBL | | 1a | 4f8e4c | LD_W_NS | u0 | u0 | s3 # | 3 | REG_CONST | 7 | 3 |
| RBL | | 1b | 4f9bcc | LD_W_NS | u0 | u0 | s2 # | 1 | REG_CONST | 9 | 1 |
| RBL | | 1c | 4f9ecc | ADD_W_AA | u0 | a2 | a3 # | 0 | ADD | 7 | ?c5 (0) |
| RBL | | 1d | 4f5fd0 | | | | | | ENTRY | 7 | |
| RBL S E ESEE | | 6 | 4f794c | LD_W_YS | u0 | ap | s1 # | 0 | USE | 7 | × (4) |
| RBL B | | 5 | 4f5bc0 | | | | | | ENTRY | 7 | |
| RBL BS EE | | 8 | 4f7a0c | CVTW_S_SS | u0 | s3 | s0 # | 0 | CONVERT | 7 | |
| RBL B SE E | | 7 | 4f7e8c | CVTW_S_SS | u0 | s2 | s4 # | 0 | CONVERT | 8 | |
| RBL BS | | a | 4f920c | ADD_W_NA | u0 | u0 | a2 # | 4 | ADD | 7 | ?i2 (0) |
| RBL B | | 9 | 59f0f4 | ADD_W_NS | u0 | u0 | s2 # | 1 | ADD | 7 | ?i3 (0) |
| RBL B | | | 59f3f4 | ADD_W_NS | u0 | u0 | s3 # | 3 | ADD | 7 | ?i4 (0) |
| RBL BS E | | c | 59eeb4 | ADD_S_SS | u0 | s1 | s0 # | 0 | ADD | 7 | |
| RBL BS E | | | 4f7acc | CVTS_W_SS | u0 | s0 | s0 # | 0 | CONVERT | 7 | |
| RBL B SE | | b | 4f7c4c | MUL_S_SS | u0 | s4 | s1 # | 0 | MUL | 8 | |
| RBL B | | d | 4f6f8c | LT_W_AA | u0 | a2 | a3 # | 0 | LT | 7 | |
| RBL BS | | 15 | 4f74cc | ST_W_SX | u0 | a2 | s0 # | 0 | ASG | 7 | A (0) (δ |
| RBL B | | 14 | 4f950c | JBRA_T_KX | u0 | u0 | u0 | | 5 | IF | 7 | |
| RBL | | 13 | 4f5dc8 | | | | | | ENTRY | 7 | |
| RBL S | | 16 | 4f7b8c | ST_W_SY | u0 | ap | s1 # | 0 | ASG | 8 | × (4) |
| RB S | | 10 | 4f5cc4 | | | | | | ENTRY | 11 | −1 (0) |
| RB S | | 1e | 4f824c | RTN | u0 | u0 | s0 # | 0 | RETURN | 11 | |
| R | | 2 | 4f58b4 | | | | | | NULL_EXIT | 3 | |
| R | | 1f | 4f5abc | | | | | | ENTRY | 3 | |

Source ranges, which include information from the source range table 42, see FIG. 1, are shown in detail in Table 2. This Table illustrates the nodes of the routine "munge" at code generation. Each line in Table 2 corresponds to a node in the compilation graph. See FIG. 7. In the "Source Unit Annotations" section of Table 2, each column is associated with a single source unit. The source unit annotations are depicted by a placing a letter indicator in the column reserved for a source unit. The letter indicates the type of source unit as described above. For example, if source unit 6 is associated with an instruction, then the letter "B" will appear in column 6 on the line for the instruction. For example, this is the line having label "5 4f5bc0".

Instead of emitting the annotations for each instruction, zero, one or more source ranges are emitted for each source unit. This is an integral part of the annotation process. A source range specifies a range of object code instructions that are associated with a source unit. This is done by specifying the starting and ending positions of the range of instructions associated with a source unit. The range is defined by a start and stop program count (PC) which is an incremental numerical for each of the instructions in the object code. Source ranges can be visualized by reference to Table 2. Each group of vertically contiguous annotations results in a single source range. For example, the source unit in column "0" is class "R" and this corresponds to the source index "0r" in FIGS. 3 and 6. This source unit (OR) has a range from label "14f59b8" to label "1f 4f5abc". Similarly, the source unit 1b in column "1" has a range from label "f 595764" to label "1e 4f824c". There may be multiple source ranges associated with a particular source unit. The widely disparate scattering of instructions resulting from optimization associated with a single source unit can be easily accommodated in this fashion.

A single machine instruction (Opcode) can map to one or more source units. For example, Opcode "CVTS_W_SS" maps to the source units in columns 0, 1, 2, 3, 6, 7 and 9.

At the tail end of code generation, the linear sequence of nodes is scanned and the corresponding source ranges are formed. This is performed by the compiler 24 in the production of the assembly code 26. This is indicated by the directive shown by line 27 to the assembler 38, see FIG. 1. The assembler 38 resolves the object module relative positions of the starting and ending instructions in the source ranges and emits them in a corresponding source unit index to the source range table 42. The source range table 42 (Table 2) becomes a data file which is provided to the debugger program 30.

OPTIMIZATION

The present invention is integral with the optimization of code in the compilation process. The source unit sets must be tracked at each transformation of a node used to effect some optimization. Based on the effect of a transformation on the source unit annotations, the transformations are divided into the categories of node: replication, merging, motion, elimination, expansion, replacement, and reordering. Each of these is discussed below.

REPLICATION

Node replication occurs when a new node is patterned directly off of an existing node. In this case, the source unit set associated with the existing node is simply propagated to the new node.

MERGING

Node merging occurs either when a new node is synthesized out of multiple existing nodes or when a group of existing nodes are merged into a single node. In this case, the source unit set of the resulting or surviving node is annotated with the union of the source unit sets from the merged nodes. Node merging occurs in the optimizations comprising assignment substitution, common subexpression elimination and redundant use elimination.

MOTION

Node motion occurs when a node is moved out of one basic block into another basic block. In this case, the moved node is re-annotated by subtracting out from the node the source units of the original basic block of the node and adding in the source units of the basic block into which the node is placed. Node motion occurs in code motion, hoist and sinking, and partial redundant subexpression elimination and is an integral component of a variety of other transformations.

ELIMINATION

Node elimination occurs when nodes are eliminated from the graph of nodes. When a node is eliminated it does not affect the source unit annotations of other nodes. This is a deep property of this process. Node elimination is a by-product of many transformations and occurs in dead code elimination.

REPLACEMENT

Node replacement occurs when an existing node is replaced by an equivalent group of newly synthesized nodes. Node replacement occurs in constant propagation, folding, algebraic and trigonometric simplification, strength reduction, and the node expansion that occurs as a part of code generation.

REORDERING

Node reordering occurs when the data flow or control flow ordering in between a group of nodes is rearranged. In this transformation, no manipulation of the source unit annotations need take place. This is a deep property of the process. Node reordering occurs in instruction scheduling.

Table 3 is an illustration of a Source Range Table in accordance with the present invention.

TABLE 3

| SOURCE RANGE TABLE | | | | |
|---|---|---|---|---|
| SRT INDEX | SU INDEX | FILE | START | END |
| 0 | 1 | 1 | 68 | 142 |
| 1 | 0 | 1 | 68 | 142 |
| 2 | 2 | 1 | 68 | 140 |
| 3 | 5 | 1 | 68 | 72 |
| 4 | 5 | 1 | 84 | 88 |
| 5 | 14 | 1 | 104 | 108 |
| 6 | 9 | 1 | 104 | 108 |
| 7 | 16 | 1 | 104 | 108 |
| 8 | 13 | 1 | 104 | 108 |
| 9 | 15 | 1 | 104 | 108 |
| 10 | 7 | 1 | 104 | 108 |
| 11 | 6 | 1 | 108 | 136 |
| 12 | 9 | 1 | 108 | 110 |
| 13 | 10 | 1 | 108 | 110 |
| 14 | 7 | 1 | 108 | 110 |
| 15 | 17 | 1 | 110 | 112 |
| 16 | 14 | 1 | 110 | 112 |
| 17 | 15 | 1 | 110 | 112 |
| 18 | 7 | 1 | 112 | 114 |
| 19 | 7 | 1 | 122 | 126 |
| 20 | 9 | 1 | 122 | 126 |
| 21 | 14 | 1 | 126 | 128 |
| 22 | 15 | 1 | 126 | 128 |
| 23 | 7 | 1 | 130 | 134 |
| 24 | 14 | 1 | 136 | 140 |
| 25 | 18 | 1 | 140 | 142 |

Figure 13:
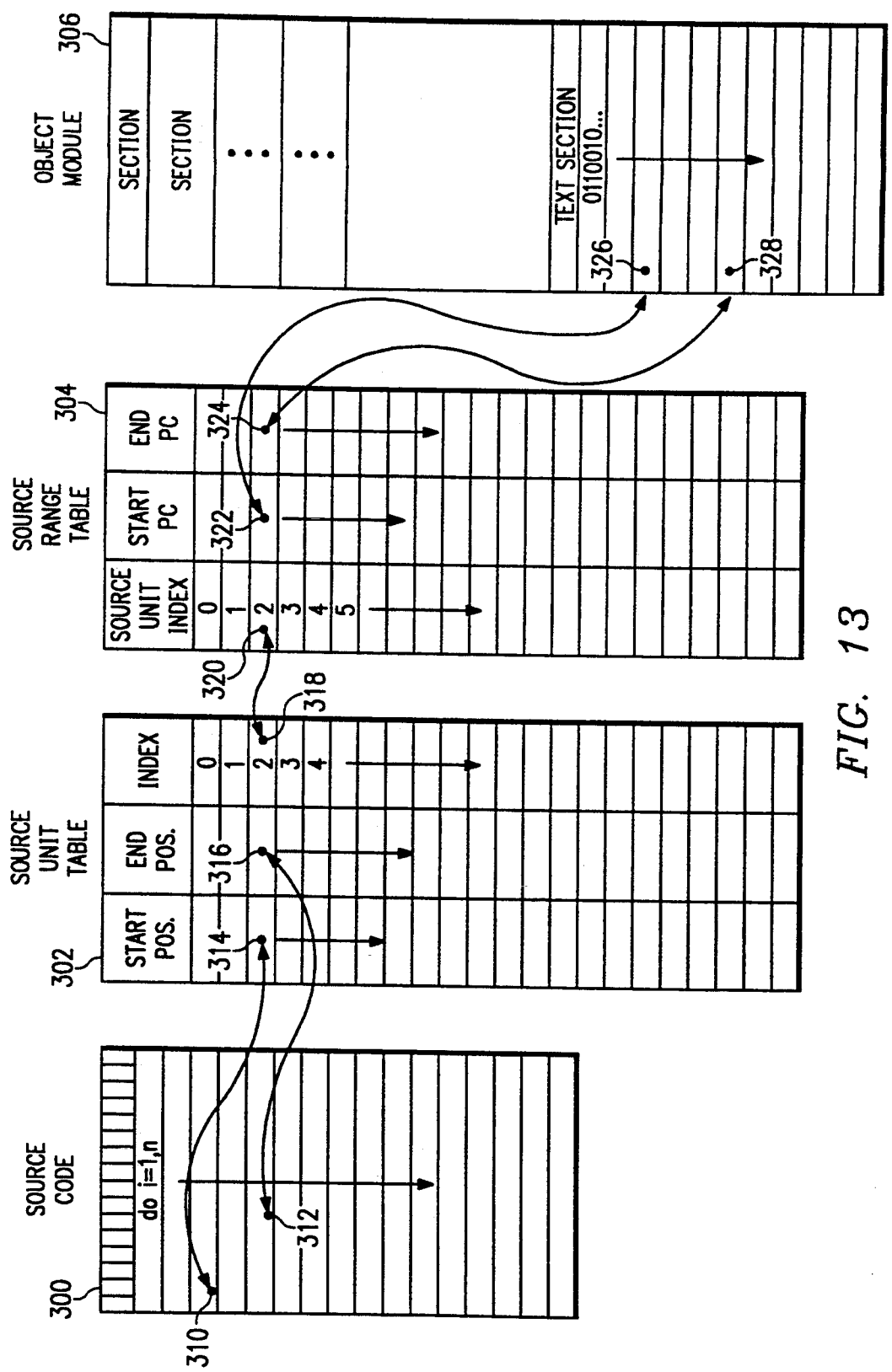
FIG. 13 is an overall illustration of the mapping of source units in the original source code to the machine instructions in the object module.

Table 3 is an example of the table 42 in FIG. 1 and is used to map between executable source units (source code) and corresponding instructions in the executable image (object code). An entry in the source range table consists of a source unit index, and a start and end instruction address in the executable image. There may be multiple address ranges for a source unit due to optimization (e.g. instruction scheduling which interleaves code for an expression). Given an instruction address, the table is used to determine which source units are active. This mapping is used, for example, to determine which source units to highlight at debugger eventpoints. Given a source unit, the table is used to determine the source unit's address ranges. This mapping is used for stepping and the setting/unsetting of breakpoints, eventpoints and tracepoints. The elements of the Table are a source range table (srt) index which is an incremental numerical listing of the entries in the source range table, a source unit (su) index which is the index number for each source unit, a file number which relates to the one of multiple object files which may comprise the executable file, a start program count (spc) address for instructions in the object file and an end (program count) number for the last instruction in the range of instructions in the object code. Referring now to FIG. 13, there is illustrated an overall view of the mapping of source units in the source code to the machine instructions in the object code. This Figure includes a listing of source code 300, a source unit table 302, a source range table 304 and an object module (object code) 306. The source code 300 consists of the matrix of the original source code. The source unit table 302 includes only the source unit index along with the start and stop positions of the source unit in the source code 300. The source range table 304 includes the source unit index and corresponding start and end program count (pc) numbers which correspond to the appropriate program count numbers for the machine language instructions in the text section of the object module 306.

Further referring to FIG. 13, the beginning and ending of a particular source unit is indicated by the dots 310 and 312. The matrix positions of the dots 310 and 312 correspond to the start and end positions 314 and 316 in the source unit table 302. The arrows between dots 310 and 312 and positions 314 and 316 indicate the one-to-one relationship of these entities.

The source unit indexes are the same in both the source unit table 302 and the source range table 304. Corresponding indexes are indicated by the reference numerals 318 and 320. The interconnecting arrow shows the direct relationship between these two index entries.

A selected start PC 322 and end PC 324 are shown in source range table 304. Machine instructions 326 and 328 define a range of instructions in the object module 306. The start PC 322 corresponds to the instruction 326 and the end PC 324 corresponds to the machine instruction 328. The interconnecting arrows indicate the one-to-one relationship between the start and end PCs and the machine instructions in the object code.

The operation of the present invention, in certain aspects, can be summarized in reference to FIG. 13. The source code 300 is parsed, as described above, to produce the source units which are listed in the source unit table 302. This produces a set of source units which correspond to the entirety of the source code 300. The compilation and optimization procedures are then carried out upon the source code. In this process, compilation nodes are created and these nodes are annotated by use of the source unit indexes. Through various compilation and optimization procedures, new nodes are created, extended or deleted, as described above. In the last step of code generation, the object module is produced which consists of the machine language instructions corresponding to the defined nodes. The resulting machine language instructions are associated with the source unit annotations for the nodes which were used to produce the machine language instructions. This information is stored in the source range table 304.

It can therefore be seen that between the source code 300 and the object module 306, there is a direct mapping back and forth between the source units and the source code and the individual instructions in the object code. For the example shown, the source unit 2 is located between the starting and ending positions indicated by dots 310 and 312 in the source code 300. This source unit index is reflected in the source unit index in the source range table 304. Within the object module, this particular source unit index (2) is executed by instructions in the range beginning with instruction 326 and ending with instruction 328 in the object module 306. The information in the source unit table 302 and the source range table 304 is utilized by the debugger program 30 (FIG. 1) to indicate which source unit of the source code corresponds to a particular machine instruction being executed by the computer which is processing the object module 306.

In practice, optimizations are realized by sequences of these node transformations. Often, components of these sequences can be optimized away, leaving implicit source unit annotations that must be explicitly handled.

The process of performing operations on sets of source units to track source to object code relationships is described above. However, a number of classes of optimization are particularly applicable to the present invention and are further described herein. These relate to code motion. This is described in reference to FIGS. 10–12.

Code motion is an optimization that refers to the process of moving loop invariant computations which are inside a loop, to a position outside the loop. When this occurs, the moved computations are disassociated with the computation of the body of the loop. For compiler loops resulting from language-level loop constructs like DO statements, there will always be a loop body block source unit that is associated with each node in the body of the loop.

The loop-level source unit set will include this source unit representing the body of the loop. When a node is moved outside the loop, the loop-level source units, including the body source unit, are subtracted out of the source unit set for that node. The node is then placed in another basic block, and the source units of this basic block are added to the node's source unit annotations.

An example of code motion optimization is presented in FIGS. 10, 11 and 12 for a DO loop. FIG. 10 is a DO loop listing which has boxes to identify the source units thereof, as in FIG. 3. FIG. 11 is a table of PRE-CODE MOTION which shows the source unit annotations before code motion and FIG. 12, POST-CODE MOTION, shows the source unit annotations after code motion. Reference is made in particular to the rows shown in bold in each of FIGS. 11 and 12. The loop of interest is depicted graphically with an arrow 280 from the instruction at the end of the loop to the first instruction of the loop. The reference to X is loop invariant and is hoisted out of the loop. See X in the statement in FIG. 10. Note that before code motion (FIG. 11), the reference to X is annotated with source unit 6. The source unit 6 is the block source unit for the iterative body of the loop. After code motion (FIG. 12), the reference to X is no longer annotated within the source unit As a component of many optimizations, the compiler 24 synthesizes a variable to communicate a value from a point in one basic block to points in other basic blocks. When a variable is synthesized to communicative value, an assignment of the variable must be made in some block and uses of the variable will be introduced in other blocks. The node representing the assignment is annotated with the source units of the node representing the value. That is, the assignment is viewed as part of the computation of the value. However, the uses that are introduced are not viewed as part of the computation of the loop. Instead, they are viewed as part of the computation which utilizes the variables value.

A still further aspect of the present invention comprises a method for "visualization" in the debugging process. This is described in reference to FIGS. 14a, 14b, 15a and 15b. As described above, the present invention relates each source unit in the source code to a range of instructions in the object code. See the overview description in FIG. 13. To assist a programmer in the debugging operation, the present invention provides display correlation between the machine instruction which is either to be executed or is in execution, or has just been executed with the source units which are designated to have a range which includes that particular machine instruction. Referring to FIG. 14A, there is illustrated a sequence of machine instructions comprising a portion of the object module. An instruction 350 is noted as being in execution by the processor. Instruction 350 is shown in a window 352 of a display 354. This instruction, and the related instructions, are a portion of the object module corresponding to the FORTRAN routine "munge" listed in FIG. 3. In accordance with the present invention, the instruction 350 is within the range for the source unit 17e (see FIG. 3). Referring now to FIG. 14B, it can be seen that the source unit 17e is the variable x. This source unit (x) is highlighted in a window 360 on a display 370.

The window 352 for the object code, and the window 360, for the source code, may be simultaneously displayed on a single display screen for the convenience of the programmer.

A still further illustration of the display aspect of the present invention is shown in FIGS. 15a and 15b. In FIG. 15a, there is shown a listing of object code with a particular instruction 380 which is in execution in a processor (computer). The object code listing is in a window 382 of a display 384. Referring to FIG. 15b, there is shown a segment of the routine "munge" with a highlight for an entire loop source unit. This is shown in a window 388 of a display 391. As noted above, the windows 382 and 388 may be on the same display screen.

The source code source unit shown in window 388 of FIG. 15b is mapped, as shown in FIG. 13, to a range of instructions in the object code which includes instruction 380 shown in FIG. 15a. When the instruction 380 is in execution or has immediately been executed, the corresponding source unit in window 388 is highlighted to indicate to the programmer the particular source code which is being executed.

The machine language instructions in execution, as shown in FIGS. 14a and 15a, may also be highlighted.

FIGS. 14a and 15a further illustrate a listing of machine language instructions with a corresponding program counter (PC) numbers. Referring to FIG. 14a, the machine instructions are in the column which include the entries NEG.W, LE.W, BRS.D and LD.W. At the top of the figure there is shown a program count as indicated by the phrase pc=(0x80001378). This corresponds to the top instruction in the window 352. This is the instruction @8 (ap). Each of the lower, sequential, machine instructions have a program count which is incremented by one unit below the noted instruction.

Referring to FIG. 15a, there is also illustrated a listing of machine instructions in the center column with a program count at the line 380. This is for the instruction "ADD.W". The program count for this instruction is pc=(0x80001382). Each of the instructions above line 380 will have a program count incremented by one space from that for line 380 and those instructions below line 380 will have incremented program counts for each step likewise.

Figure 16:
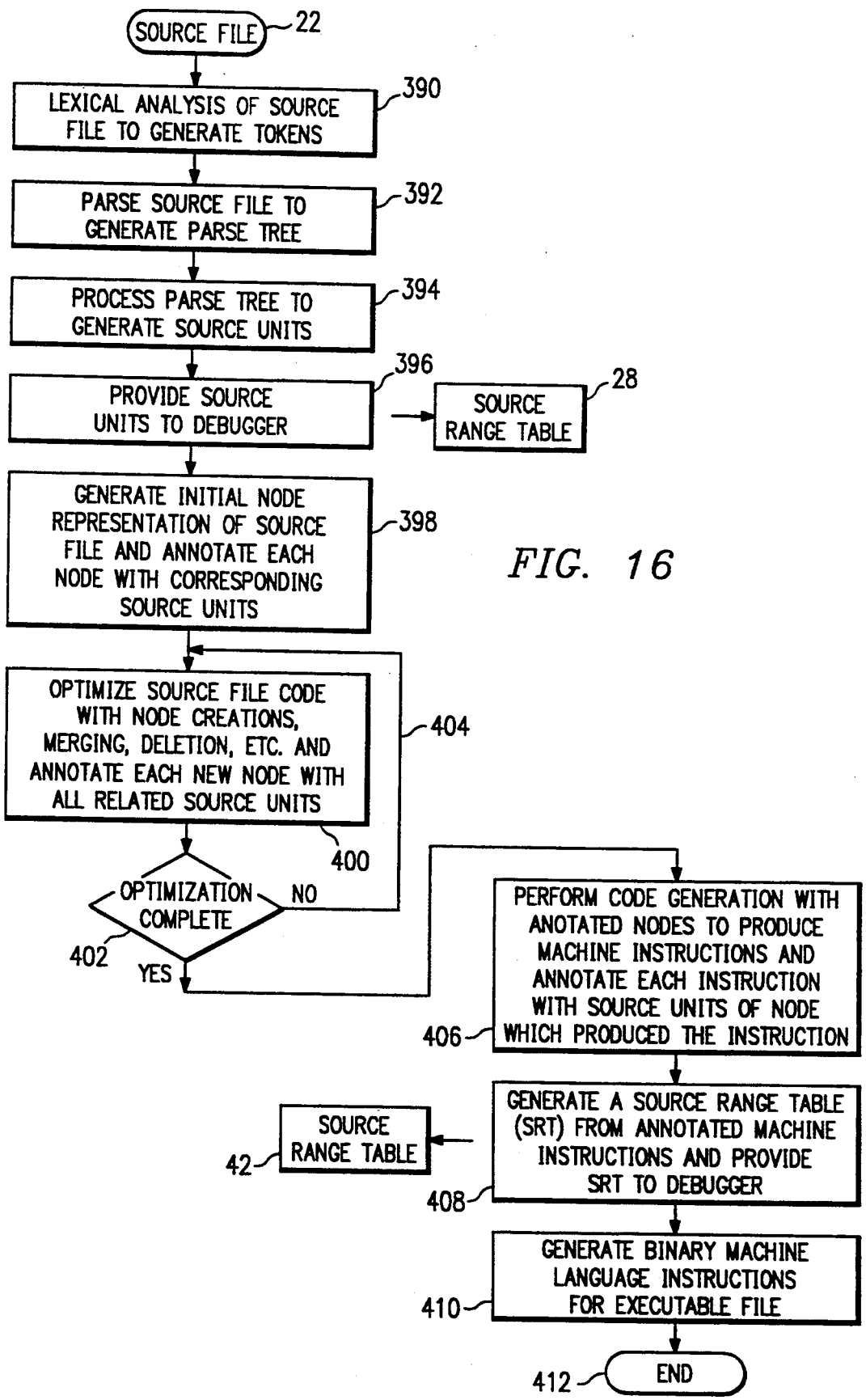

A flow diagram illustrating the operation of the present invention is shown in FIG. 16. This illustrates the sequential steps carried out in conjunction with the compilation process to generate the tables used for providing source to object code correlation. The source file 22 is provided to operational block 390 in which lexical analysis of the source file is carried out to generate tokens. Next, in operational block 390, the source file is parsed to generate a parse tree. The operations carried out in blocks 390 and 392 are conventional in compiler technology.

Following block 392, an operation is carried out in block 394 to process the parse tree and generate source units. The source units have been described in detail above and the methods of generating the source units have also been described. An example of a routine with source units is shown in FIG. 3.

After the source units are generated in block 394, operation is transferred to a block 396 in which the source units are provided to the debugger program 30. This is in the form of the source unit table 28 described above. The table 28 is preferably a file provided to the debugger program 30.

The source code is processed at the beginning stage in the block 398 in which there are generated initial node representations for each source file. Further, each node is annotated with the corresponding source units. Continuing further in the compilation process, in block 400, the source file code is optimized with various node operations, described above, including creations, merging, deletions and so forth. Each new node is annotated with the related source units. In a question block 402, following block 400, a determination is made whether additional optimization steps should be performed. If the optimization is not complete, control is transferred through a line 404 to implement additional optimizing processes in block 400. After optimization has been completed, control is transferred from question block 402 to operational block 406 for code generation. The nodes produced as a result of the compilation and optimization are used to produce machine language instructions and each of these instructions is annotated with the source units for the node which produced the instruction.

Following block 406, entry is made to operational block 408 to generate a source range table, such as table 42, from the annotated machine instructions and this table is provided to the debugger program 30. Finally, in block 410, the binary machine language instructions are produced for the executable file. The process is completed at an end step 412.

Figure 17:
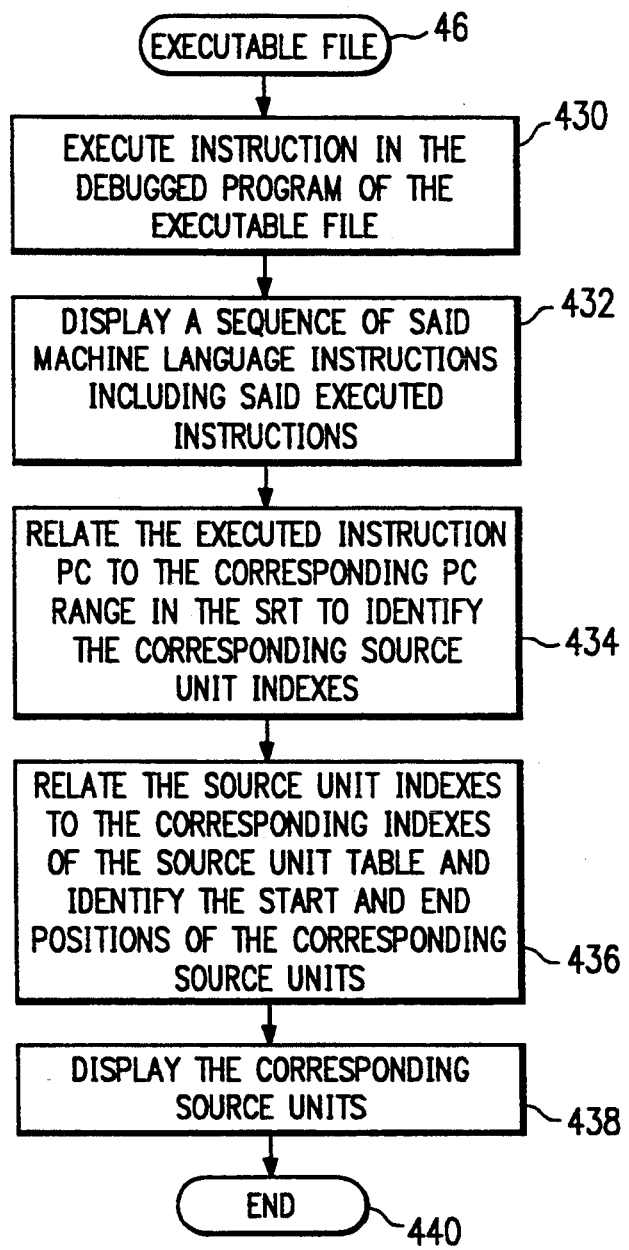
FIG. 17 is a flow diagram illustrating the use of the present invention for debugging a program.

Referring now to FIG. 17 there is illustrated the operation of the present invention for utilizing the source unit tables and source range tables described above. The executable file 46 is used by an operational block 430 wherein the file is provided to a processor for execution for debugging of the program being executed. The debugging operation provides sequential execution of the machine language instructions in which the programmer monitors the operation of the program to locate and resolve problems.

In operational block 432, a sequence of the machine language instructions are displayed and this includes at least the particular instruction for execution in the processor. See FIG. 14a.

In operational block 434, the executed instruction is examined to determine the program count (PC) for that instruction. This is related to the source range table to determine the program count ranges in which the executed instruction is included. This identifies the corresponding source unit indexes. Continuing in operational block 436, the identified source unit indexes are related to the corresponding indexes of the source unit table which in turn identifies the start and end positions of the corresponding source units in the source unit table. Continuing to operational block 436, the corresponding source units are displayed as shown in FIGS. 14b and 15b to highlight the source units that correspond to the machine instruction which was executed. There may be one or more highlighted source units which relate to a particular machine instruction.

In summary, the present invention is a method for use with a debugger program to correlate units of source code with instructions in object code in a compiler environment wherein there may have been one or more steps of optimization that can produce a complex relationship between the source code and object code. This is carried out by processing the source code to define source units in the code, producing compiler nodes which are annotated with the source units and then generating instructions that are defined within ranges for each source unit. Further, when the machine instructions are in the process of execution, the present invention can display the particular source units and corresponding machine instructions being executed by the processor.

Although only one embodiment of the invention has been illustrated in the accompanying drawings and described in the foregoing Detailed Description, it will be understood that the invention is not limited to the embodiment disclosed, but is capable of numerous rearrangements, modifications and substitutions without departing from the scope of the invention.

What we claim is:

1. A method for establishing a relationship between machine language instructions in object code with elements of source code which was compiled to produce the object code, the method comprising the steps of:

processing said source code to produce therefrom a plurality of source units which reflect the syntax of said source code wherein each source unit corresponds to an element or set of related elements of said source code, processing said source code, in conjunction with said compilation, to produce compiler nodes, generating an annotation for each of said compiler nodes to identify the ones of said source units related to each of the compiler nodes, producing said machine language instructions by use of said compiler nodes, and defining ranges of said machine language instructions to establish through said annotations a correspondence between the machine language instructions in each of said ranges and ones if said source units which are related to the machine language instructions in each of said ranges.

2. A method for establishing a relationship between machine language instructions in object code with the elements of the source code as recited in claim 1 wherein the steps of processing said source code to produce compiler nodes and generating an annotation includes the steps of:

logically stacking related ones of said source units wherein each source unit in said stack is immediately above it's immediate parent source unit, and generating one of said compiler nodes for each source unit in said stack and annotating the generated compiler node with indexes for that source unit and each of the source units below the source unit in the stack for which the compiler node is generated.

3. A method for establishing a relationship between machine language instructions in object code with the elements of the source code as recited in claim 1 wherein said step of processing said source code to produce compiler nodes includes generating computation nodes which reflect computations in said source code and generating entry nodes which reflect the flow of said source code.

4. A method for establishing a relationship between machine language instructions in object code with elements of corresponding source code, the method comprising the steps of:

processing said source code to produce therefrom a plurality of source units which reflect the syntax of said source code wherein each source unit corresponds to an element or set of related elements of said source code, processing said source code with optimizing processes to produce compiler nodes, generating an annotation for each of said compiler nodes to identify the ones of said source units related to each of the compiler nodes, producing said machine language instructions from said compiler nodes and annotating each said produced machine instruction with the source units annotated for the corresponding compiler node, and defining ranges of said machine language instructions to establish through said annotations a correspondence between the machine language instructions in each of said ranges and ones of said source units which are related to the machine language instructions in each of said ranges.

5. A method for establishing a relationship between machine language instructions in object code with the elements of the source code as recited in claim 4 wherein the step of generating an annotation and processing said source code to produce compiler nodes includes the steps of:

logically stacking related ones of said source units wherein each source unit in said stack is immediately above it's immediate parent source unit, and generating one of said compiler nodes for each source unit in said stack and annotating the generated compiler node with indexes for that source unit and each of the source units below the source unit in the stack for which the compiler node is generated.

6. A method for establishing correlation between object code and corresponding source code, comprising the steps of:

processing said source code to produce therefrom a plurality of source units each of which includes a unique index, a position identification in said source code, a context identification of said source unit in said source code, a linkage to other source units, and a class identification of the source unit, processing said source code to produce compiler nodes, which include entry nodes and computation nodes, generating an annotation for each of said compiler nodes to identify the ones of said source units related to each of the compiler nodes, producing said machine language instructions by use of said compiler nodes, and generating a source range table which specifies one or more ranges of said machine instructions which are associated with each of said source units, wherein each element of said source code can be related to corresponding ones of said machine instructions through said source units and said source range table.

7. A method for use in a debugger program for indicating a unit of source code which corresponds to a selected object code machine language instruction in a computer, wherein the object code was produced from the source code through compilation, the method comprising the steps of:

processing said source code to produce therefrom a plurality of source units which reflect the syntax of said source code wherein each source unit corresponds to an element or set of related elements of said source code, processing said source code, in conjunction with said compilation process, to produce computation nodes which correspond to computations in said source code, generating an annotation for each of said computation nodes to identify the ones of said source units related to each of the compiler nodes, producing said machine language instructions by use of said compiler nodes, establishing ranges for said machine language instructions corresponding to said compiler nodes to thereby establish through said annotations a correspondence between the machine language instructions in said object code and said source units in said source code, determining by use of said correspondence the ones of said source units which correspond to said selected machine language instruction in said computer, and displaying a sequence of said source units of said source code on a display and highlighting one or more of said ones of said source units which correspond to said selected machine language instruction.

8. A method for establishing a relationship between machine language instructions in object code with the elements of the source code as recited in claim 7 wherein the steps of processing said source code to produce compiler nodes and generating an annotation includes the steps of:

logically stacking related ones of said source units wherein each source unit in said stack is immediately above it's immediate parent source unit, and generating one of said compiler nodes for each source unit in said stack and annotating the generated compiler node with indexes for that source unit and each of the source units below the source unit in the stack for which the compiler node is generated.

9. A method for establishing a relationship between machine language instructions in object code with the elements of the source code as recited in claim 7 wherein said step of processing said source code to produce compiler nodes includes generating computation nodes which reflect computations in said source code and generating entry nodes which reflect the flow of said source code.

* * * * *